US008468527B2

(12) United States Patent
Rai (10) Patent No.: US 8,468,527 B2
(45) Date of Patent: Jun. 18, 2013

(54) METHOD AND SYSTEM FOR OPTIMAL BATCHING IN A PRODUCTION ENVIRONMENT

(75) Inventor: Sudhendu Rai, Fairport, NY (US)

(73) Assignee: Xerox Corporation, Norwalk, CT (US)

(*) Notice: Subject to any disclaimer, the term of this patent is extended or adjusted under 35 U.S.C. 154(b) by 1460 days.

(21) Appl. No.: 11/735,787

(22) Filed: Apr. 16, 2007

(65) Prior Publication Data

US 2008/0256541 A1  Oct. 16, 2008

(51) Int. Cl.
*G06F 9/46* (2006.01)

(52) U.S. Cl.
USPC .................. 718/101; 358/1.13; 358/1.15

(58) Field of Classification Search
None
See application file for complete search history.

(56) References Cited

U.S. PATENT DOCUMENTS

| | | | | |
|---|---|---|---|---|
| 5,559,933 | A * | 9/1996 | Boswell ....................... 358/1.15 |
| 6,805,502 | B2 * | 10/2004 | Rai et al. ........................ 400/61 |
| 6,970,261 | B1 * | 11/2005 | Robles ........................ 358/1.15 |
| 6,993,400 | B2 | 1/2006 | Viassolo |
| 7,065,567 | B1 | 6/2006 | Squires et al. |
| 7,079,266 | B1 * | 7/2006 | Rai et al. ...................... 358/1.13 |
| 7,099,037 | B2 * | 8/2006 | Clark et al. ................... 358/1.18 |
| 7,567,360 | B2 * | 7/2009 | Takahashi et al. ........... 358/1.15 |
| 7,649,640 | B2 * | 1/2010 | Young et al. ................. 358/1.13 |
| 7,742,185 | B2 | 6/2010 | Lofthus et al. |
| 7,755,778 | B2 * | 7/2010 | Rai et al. ....................... 358/1.1 |
| 8,145,517 | B2 * | 3/2012 | Rai .............................. 705/7.12 |
| 8,384,927 | B2 * | 2/2013 | Harmon et al. .............. 358/1.15 |
| 2002/0124756 | A1 * | 9/2002 | Rai et al. ....................... 101/484 |
| 2002/0129081 | A1 * | 9/2002 | Rai et al. ....................... 709/102 |
| 2003/0098991 | A1 * | 5/2003 | Laverty et al. ............... 358/1.15 |
| 2003/0149747 | A1 * | 8/2003 | Rai et al. ....................... 709/219 |
| 2005/0015504 | A1 * | 1/2005 | Dorne et al. .................. 709/229 |
| 2005/0060650 | A1 * | 3/2005 | Ryan et al. .................... 715/526 |
| 2006/0132512 | A1 * | 6/2006 | Walmsley et al. ................ 347/5 |
| 2006/0268317 | A1 * | 11/2006 | Lofthus et al. ............... 358/1.15 |
| 2007/0019228 | A1 | 1/2007 | Rai et al. |
| 2007/0047454 | A1 * | 3/2007 | Fujii ............................. 370/245 |
| 2007/0092323 | A1 * | 4/2007 | Lin et al. ......................... 400/61 |
| 2007/0139695 | A1 * | 6/2007 | Young et al. ................. 358/1.15 |
| 2007/0229896 | A1 * | 10/2007 | Fujimori et al. ............. 358/1.16 |
| 2007/0236725 | A1 * | 10/2007 | Harmon et al. .............. 358/1.15 |
| 2008/0256541 | A1 | 10/2008 | Rai |

FOREIGN PATENT DOCUMENTS

| | | |
|---|---|---|
| JP | 11282909 A | 10/1999 |
| JP | 2007272899 A | 10/2007 |

OTHER PUBLICATIONS

Rai, et al., "A Lean Document Production Controller for Printshop Management", Proceedings of the 42.sup.nd IEEE Conference on Decision and Control, Maui, Hawaii, Dec. 2003.

* cited by examiner

*Primary Examiner* — Emerson Puente
*Assistant Examiner* — Hiren Patel
(74) *Attorney, Agent, or Firm* — Fox Rothschild LLP (57) ABSTRACT

A method for processing a plurality of jobs in a production environment may include receiving a plurality of jobs and receiving one or more instructions into a workflow management system to process the plurality of jobs. The one or more instructions may include a setup characteristic. The method may also include clustering, by the workflow management system, the plurality of jobs into super-groups based on the setup characteristic, determining, by the workflow management system, a processing sequence based on the clustering and processing the jobs according to the determined processing sequence.

10 Claims, 9 Drawing Sheets

FIG. 1

| SEQUENCE 1 | FORM TYPE | SEQUENCE 2 | FORM TYPE |
|---|---|---|---|
| J1 | A | J1 | A |
| J2 | A | J2 | A |
| J3 | A | J9 | A |
| J4 | B | J3 | A |
| J5 | B | J4 | B |
| J6 | C | J5 | B |
| J7 | C | J10 | B |
| J8 | C | J6 | C |
| J9 | A | J7 | C |
| J10 | B | J8 | C |
| SETUP DELAYS | 4 | | 2 |

FIG. 2

| SEQUENCE | FORM TYPE |
|---|---|
| J1 | A |
| J2 | B |
| J3 | A |
| J4 | A |
| J5 | C |
| J6 | B |
| J7 | C |
| J8 | C |
| J9 | A |
| J10 | C |

| SEQUENCE | FORM TYPE | |
|---|---|---|
| J4 | A | |
| J1 | A | SG1 310 |
| J3 | A | |
| J9 | A | |
| J6 | B | SG2 315 |
| J2 | B | |
| J10 | C | |
| J8 | C | SG3 320 |
| J5 | C | |
| J7 | C | |

| SEQUENCE | FORM TYPE 405 | INSERT TYPE 410 |
|---|---|---|
| J1 | F1 | I2 |
| J2 | F3 | I1 |
| J3 | F2 | I2 |
| J4 | F1 | I2 |
| J5 | F2 | I3 |
| J6 | F1 | I1 |
| J7 | F2 | I3 |
| J8 | F1 | I3 |
| J9 | F3 | I3 |
| J10 | F3 | I2 |

| SEQUENCE | FORM TYPE | INSERT TYPE | |
|---|---|---|---|
| J1 | F1 | I2 | |
| J4 | F1 | I2 | SG1 |
| J6 | F1 | I1 | 415 |
| J8 | F1 | I3 | |
| J3 | F2 | I2 | |
| J5 | F2 | I3 | SG2 |
| J7 | F2 | I3 | 420 |
| J2 | F3 | I1 | |
| J9 | F3 | I3 | SG3 |
| J10 | F3 | I2 | 425 |

FIG. 4B

| SEQUENCE | FORM TYPE | INSERT TYPE | |
|---|---|---|---|
| J2 | F3 | I1 | SG1' |
| J6 | F1 | I1 | 430 |
| J1 | F1 | I2 | |
| J3 | F2 | I2 | |
| J4 | F1 | I2 | SG2' |
| J10 | F3 | I2 | 435 |
| J5 | F2 | I3 | |
| J7 | F2 | I3 | SG3' |
| J8 | F1 | I3 | 440 |
| J9 | F3 | I3 | |

| SEQUENCE | FORM TYPE | INSERT TYPE |
|---|---|---|
| J5 | B | 1 |
| J6 | A | 1 |
| J10 | C | 1 |
| J2 | A | 2 |
| J3 | A | 2 |
| J4 | B | 2 |
| J7 | C | 2 |
| J9 | B | 2 |
| J1 | B | 3 |
| J8 | C | 3 |

| SEQUENCE | FORM TYPE | INSERT TYPE |
|---|---|---|
| J5 | B | 1 |
| J10 | C | 1 |
| J6 | A | 1 |
| J2 | A | 2 |
| J3 | A | 2 |
| J4 | B | 2 |
| J9 | B | 2 |
| J7 | C | 2 |
| J8 | C | 3 |
| J1 | B | 3 |

METHOD AND SYSTEM FOR OPTIMAL BATCHING IN A PRODUCTION ENVIRONMENT

BACKGROUND

Production jobs are conventionally performed sequentially, independent of the job's complexity or processing requirements. As such, production jobs are typically processed in the order in which they are received, and each job is conventionally processed in the same manner as every other job. A document production system that processes print jobs may be used as an example. If a print job must be printed, cut and bound, the job is first printed in one print shop department, queued to a second department where the job is cut, and finally queued to a third department where the job is bound. Sequential processing causes significant work-in-progress delays, however, and leads to increased inventory costs.

Methods for optimizing the performance of a document production system using autonomous cells are known in the art. Such methods are described in, for example, U.S. Pat. No. 7,079,266 to Rai et al., the disclosure of which is incorporated by reference in its entirety. Methods for determining optimal batch-sizes for print jobs are also known in the art. Such methods are described in, for example, U.S. Pat. No. 6,805,502 to Rai et al., the disclosure of which is incorporated by reference in its entirety. Batch splitting sub-divides a large document production job into smaller sub-jobs. This optimizes job turnaround time by balancing setup time with waiting time between processes. Setup time is especially critical in print environments that utilize continuous feed equipment. The setup time in such environments may be as long as thirty minutes. These delays may significantly impact throughput, especially in light of the high processing rates of continuous feed equipment. In addition, the setup times at each processing station are not always constant. Accordingly, batch-splitting methods are needed to improve the processing flow in environments that have sequence dependent setups.

The disclosure contained herein describes the methods of resolving one or more of the problems discussed above.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "job" is a reference to one or more jobs and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

In an embodiment, a method for processing a plurality of jobs in a production environment may include receiving a plurality of jobs and receiving one or more instructions into a workflow management system to process the plurality of jobs. The one or more instructions may include a setup characteristic. The method may also include clustering, by the workflow management system, the plurality of jobs into super-groups based on the setup characteristic, determining, by the workflow management system, a processing sequence based on the clustering and processing the jobs according to the determined processing sequence.

In an embodiment, a method for processing a plurality of jobs in a production environment may include receiving a plurality of jobs to be processed in a production environment and receiving, by a workflow management system, instructions to process the plurality of jobs. The instructions may include a first setup characteristic and a second setup characteristic for each job. The method may also include clustering, based on the first setup characteristic, the jobs into a first set of super-groups, clustering, based on the second setup characteristic, the jobs into a second set of super-groups and determining which set of the first and second super-group sets optimizes process flow in the production environment. The method may further include determining a processing sequence based on which one of the first and second super-group sets is determined to optimize process flow, and processing the jobs based on the processing sequence.

In an embodiment, a system for processing a plurality of jobs in a production environment may include a plurality of document production resources in a print shop, a workflow management system that coordinates the flow of jobs to the resources and a computer-readable storage medium. The computer-readable storage medium may include one or more programming instructions that, when executed, instruct the workflow management system to receive a plurality of jobs, receive one or more instructions to process the plurality of jobs that may include a setup characteristic for each job, cluster the plurality of jobs into super-groups based on the setup characteristic for each job, determine a processing sequence based on the clustering and process the jobs on the resources according to the determined processing sequence.

DETAILED DESCRIPTION

For purposes of the discussion below, a "print shop" refers to an entity that includes a plurality of document production resources, such as printers cutters, collators and the like. The print shop may be a freestanding entity, including one or more print-related devices, or it may be part of a corporation or other entity. Additionally, the print shop may communicate with one or more servers by way of a local area network or a wide area network, such as the Internet, the World Wide Web or the like.

A "Job" refers to a logical unit of work that is to be completed for a customer. A job may include one or more print jobs from one or more clients. A production system may include a plurality of jobs. Although the disclosed embodiments pertain to document production systems, it will be apparent to one of ordinary skill in the art that the disclosed methods and systems can be applied to production systems in general.

A "print job" refers to a job processed in a document production system. For example, a print job may include producing credit card statements corresponding to a certain credit card company, producing bank statements corresponding to a certain bank, printing a document, or the like.

Figure 1:
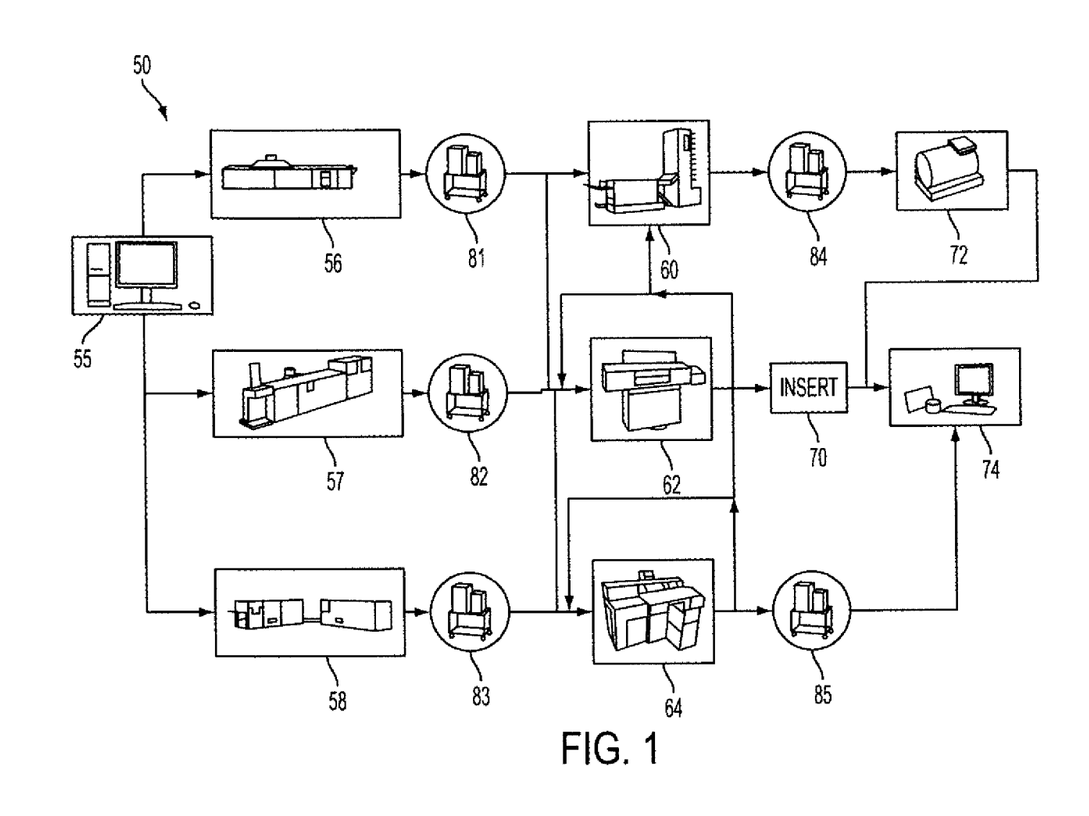
FIG. 1 illustrates an exemplary print shop production environment according to an embodiment.

FIG. 1 shows an example of a production environment 50, in this case, exemplary elements of a print shop. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 60, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85.

Different elements of a production environment may require setup time in order to prepare the device to process a particular job. For example, some print jobs use pre-printed forms, such as bank statements, pre-printed with the bank's logo and contact instructions or credit card statements pre-printed with charge dispute procedures. Forms also may include inserts such as marketing materials or subscription cards. If a device in a print shop environment receives two consecutive jobs that use identical forms, then little or no changeover is required between the two jobs. However, if the forms are different, then the jobs have different setup characteristics, and a significant setup time may be required to load the new form into the machine. This is especially noticeable in continuous feed printing devices 58, where it can take up to 15 minutes or more to load a new form roll.

Thus, in an embodiment, jobs received into a production environment may be sorted based on a setup characteristic before being processed in order to better optimize the flow of production. A setup characteristic may include a feature of any step in the production process. For example, in a document production system, the printer setup may be dependent on the type of form used. Alternatively, the insertion operation setup may depend on one or more inserts associated with each job.

For example, four jobs may be processed. The first job may include bank statements from Bank A. The second job may include credit card statements from Credit Card Company B. The third job may include credit card statements from Credit Card Company C, and the fourth job may include more bank statements from Bank A. In an embodiment, the four jobs may be printed on a continuous feed machine, but some or all of them may require different pre-printed forms. As such, in this example, the setup characteristic refers to the form type associated with each job. If two consecutive jobs are printed on the same type of form, then little or no setup time may be required between processing the first job and the second job. However if consecutive jobs are printed on different form types, a lengthy setup time may be incurred. The lengthy setup time may result from changing a form type, ink or the like. The setup time may cause a substantial reduction in the shop's throughput, especially in light of the high processing speed of continuous feed machines.

Figure 2:
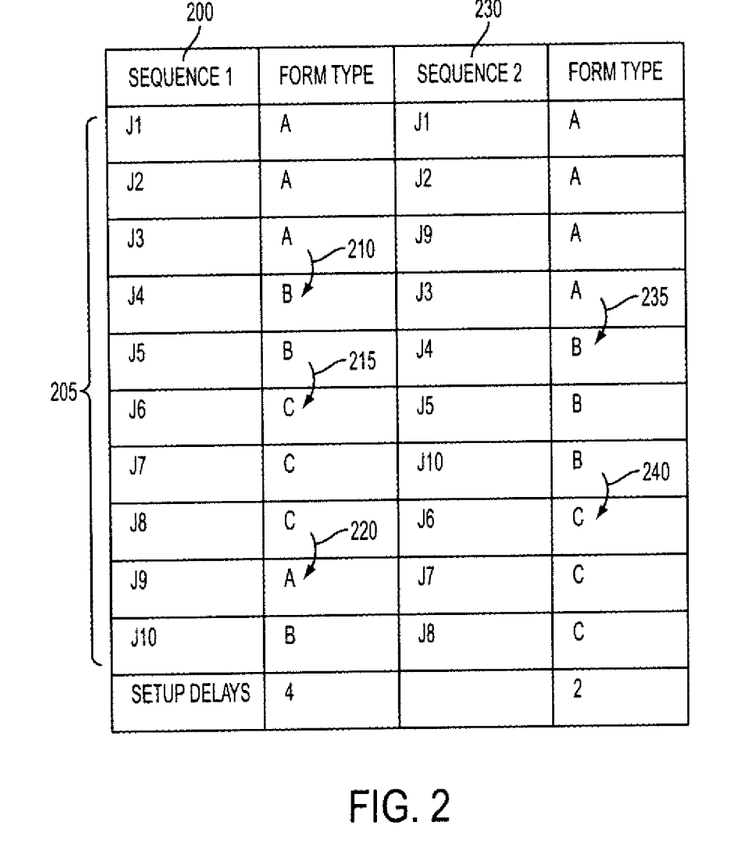
FIG. 2 depicts sorting a plurality of jobs according to an embodiment.

As illustrated by FIG. 2, setup delays may be minimized by sorting jobs using a setup characteristic so that the jobs requiring the same setup characteristic are grouped and processed together. In FIG. 2, Sequence 1 200 includes ten jobs 205, J1-J10, arranged in the order in which they are received in the production environment designated as following sequence: J1, J2, J3, J4, J5, J6, J7, J8, J9, J10. Each job may require one of three different forms, designated as form type A, B or C. As illustrated by FIG. 2, no setup delay may be incurred when transitioning between jobs J1 and J2 or jobs J2 and J3 because jobs J1, J2 and J3 each require Form Type A. However, a setup delay may be incurred between jobs J3 and J4 210, J5 and J6 215 and J8 and J9 220 because these jobs require different form types. As such, the processing of all of the jobs in the sequence in which they are received incur four setup delays 225.

Sequence 2 230 includes the same ten jobs 205, J3-J10, but the jobs are arranged in the following sequence: J1, J2, J9, J3, J4, J5, J10, J6, J7, J8. As illustrated by FIG. 2, setup delays may be incurred between jobs J3 and J4 235 and J10 and J6 240. By sorting the jobs according to form type, the number of setup delays for Sequence 2 230 as compared with Sequence 1 200 may be reduced. Although FIG. 2 illustrates sorting jobs by form type, it is understood that the jobs may be sorted according to other setup characteristics such as insert type, number of inserts, binding type, shrink-wrap type or the like.

Figure 3A:
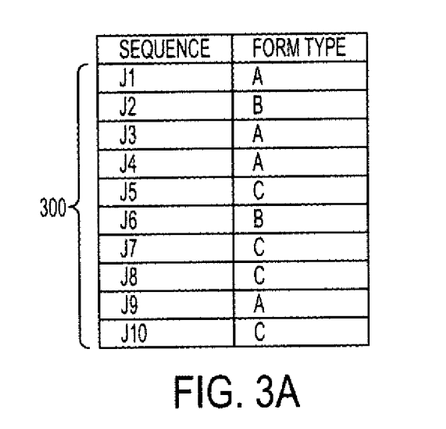
FIG. 3 depicts sorting a plurality of jobs by a setup characteristic and clustering the plurality of jobs into super-groups according to an embodiment.
Figure 3B:
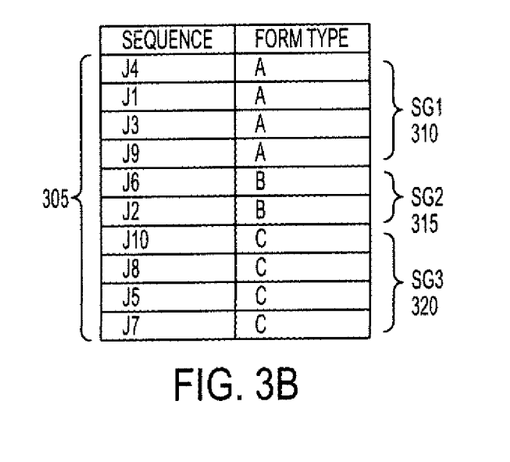

In an embodiment, super-jobs may be created by sorting jobs according to setup characteristics. For example, as illustrated by FIG. 3A, there may be ten jobs 300 to be processed. After sorting the jobs 300 according to form type, as illustrated by FIG. 3B, the jobs may be clustered in the following order: J4, J1, J3, J9, J6, J2, J10, J8, J5, J7 305. Super-groups may include the jobs that have the same setup characteristic. In an embodiment, jobs in a super-group may be directed to a common resource for processing.

For example, FIG. 3B illustrates three super-groups. SG1 310, SG2 315 and SG3 320. SG1 310 may include jobs J4, J1, J3 and J9 because these four jobs are all printed on Form A. SG2 315 may include jobs J6 and J2 because these two jobs are printed on Form B. SG3 320 may include jobs J10, J8, J5 and J7 because these four jobs are printed on Form C. In an embodiment, jobs may be clustered into super-groups and the super-groups may be arranged in a sequence that requires the shortest processing time.

Figure 4A:
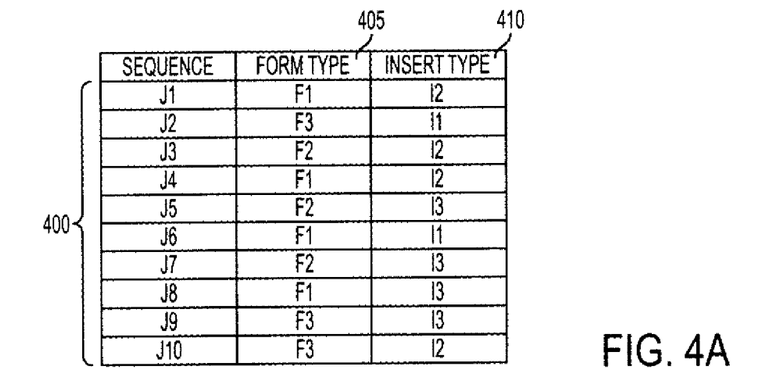
FIG. 4A depicts a plurality of jobs comprising form type and insert type setup characteristics according to an embodiment.

In an embodiment, jobs may be independently sorted based on a plurality of setup characteristics. As illustrated in FIG. 4A, jobs may contain one or more setup characteristics, and the jobs may be sorted according to any one of the characteristics. For example, in FIG. 4A, jobs J1-J10 400 have both a form type setup characteristic 405 and an insert setup characteristic 410. An insert setup characteristic may indicate that the insertion operation setup requires one or more different inserts to be associated with each job.

Figure 4B:
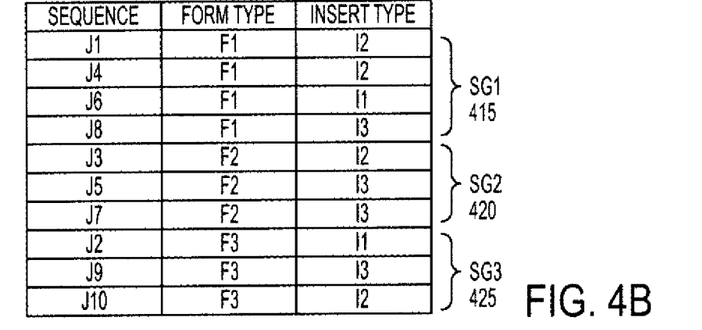
FIG. 4B depicts sorting the plurality of jobs by form type according to an embodiment.

FIG. 4B illustrates sorting the jobs 400 of FIG. 4A by a first setup characteristic, in this case form type. The jobs to be printed on Form 1, F1, are grouped together. The jobs to be printed on Form 2, F2, are grouped together. Further, the jobs to be printed on Form 3, F3, are grouped together.

Figure 4C:
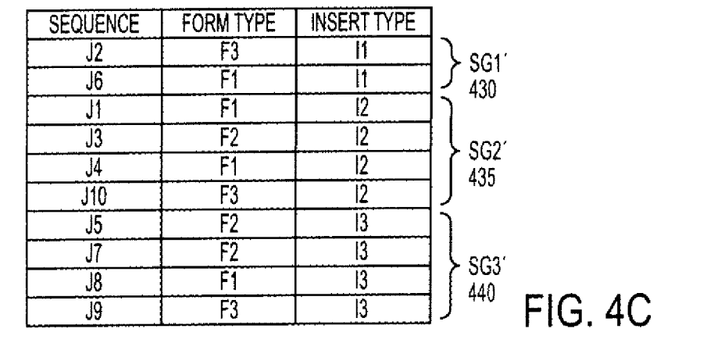
FIG. 4C depicts sorting the plurality of jobs by insert type according to an embodiment.

FIG. 4C illustrates sorting the jobs 400 of FIG. 4A by insert type rather than form type. As reflected by FIG. 4C, the jobs associated with Insert 1, I1, are clustered together, the jobs associated with Insert 2, I2, are clustered together and the jobs associated with Insert 3, I3, are clustered together.

As illustrated by FIG. 4B and FIG. 4C, super-jobs may include different jobs depending on which setup characteristic is used as the first sorting criterion. For example, in FIG. 4B, the first super-group SG1 415, includes jobs J1, J4, J6 and J8, the second super-group SG2 420, includes jobs J3, J5 and J7 and the third super-group, SG3 425, includes jobs J2, J9 and J10. In contrast, as illustrated by FIG. 4C, when the jobs are sorted based on insert type rather than form type, the first super-group, SG1' 430 includes jobs J2 and J6, the second super-group, SG2' 435, includes jobs J1, J3, J4 and J10 and the third super-group, SG3' 440, includes jobs J5, J7 J8 and 49.

Figure 5:
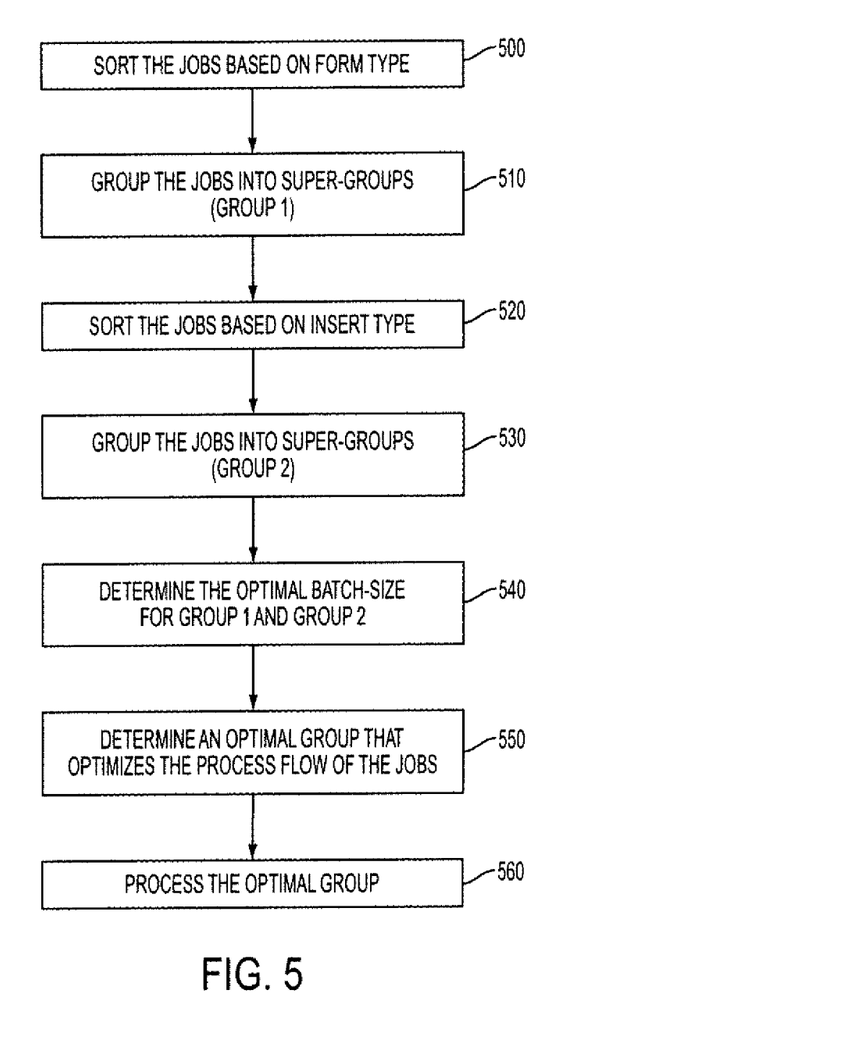
FIG. 5 depicts an exemplary flow chart that provides an overview of a batch-splitting process according to an embodiment.

In an embodiment, the sorting scenarios illustrated by FIG. 4B and FIG. 4C may be simulated to determine which batch-splitting method is best for a given situation. FIG. 5 depicts an exemplary flow chart that provides an overview of this process according to an embodiment. As discussed with regard to FIG. 4B and FIG. 4C, jobs may include setup characteristics such as form type and insert type. The jobs may be sorted 500 by a first setup characteristic (e.g., form type), and then grouped 510 into a first set of super-groups. The jobs may also be sorted 520 by a second setup characteristic (e.g., insert type) and grouped 530 into a second set of super-groups. An optimal batch-size may then be determined 540 for each set of super-groups to determine which set of super-groups should be used to process the job. In an embodiment, the super-groups may be used as inputs for a batch-splitting algorithm such as that described in U.S. Pat. No. 6,805,502 to Rai et al. As discussed above, jobs may be grouped according to different setup characteristics, with each group producing different super-groups. Predicting which group will optimize the process flow may be difficult because the determination depends on at least the sizes of the jobs, the number of jobs and the setup time. As such, a batch-splitting model may be applied to each set of super-groups to determine 550 which set of the super-groups best optimizes the process flow. Optimization may include, for example, determining which set of super-groups will require the lowest possible production time for processing. The optimal set of super-groups may then be processed 560.

Figure 6A:
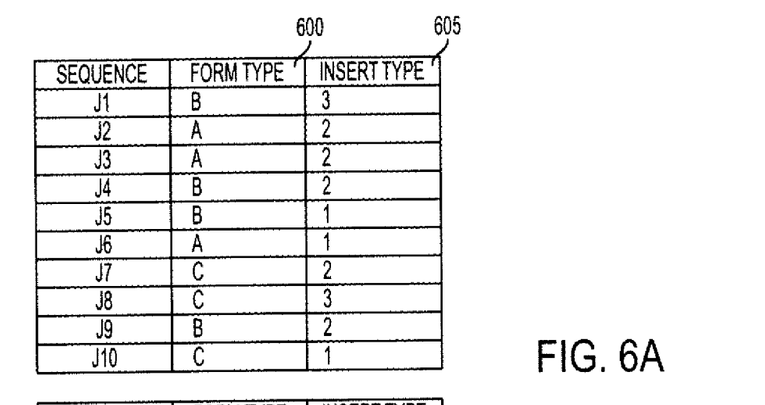
FIG. 6A depicts a plurality of jobs comprising form type and insert type setup characteristics according to an embodiment.
Figure 6B:
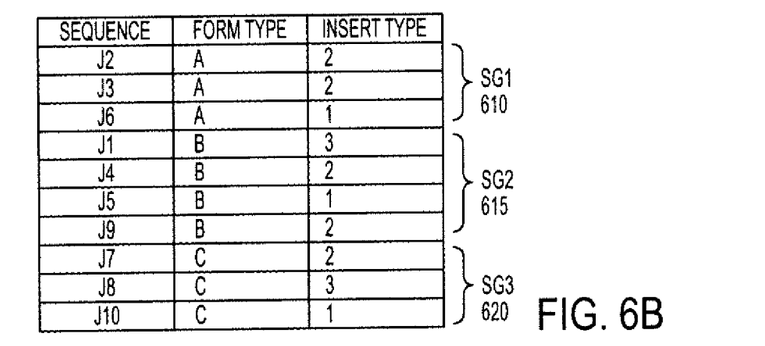
FIG. 6B depicts sorting the plurality of jobs first by form type and clustering the plurality of jobs into super-groups according to an embodiment.
Figure 6C:
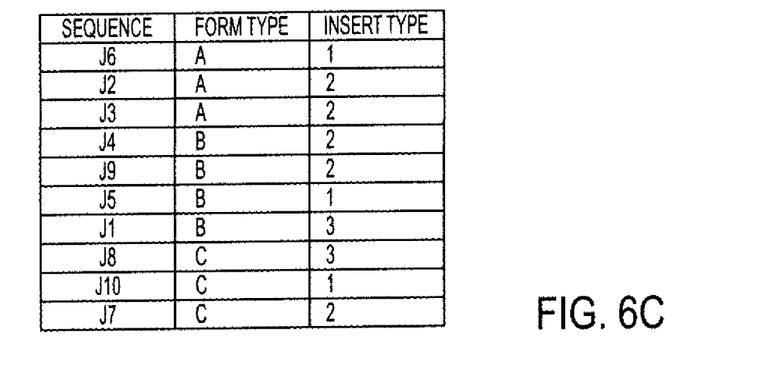
FIG. 6C depicts sorting the super-groups by insert type according to an embodiment.

In an embodiment, jobs may be sorted by two or more setup characteristics rather than by one setup characteristic at a time. For example, as illustrated in FIG. 6A, jobs may have a form type setup characteristic 600 as well as an insert type setup characteristic 605. The jobs may first be sorted by form type, as illustrated in FIG. 6B. Sorting by form type creates three super-groups: SG1 610, SG2 615 and SG3 620. Each of these super-groups may then be sorted by insert type, as illustrated in FIG. 6C. As such, the jobs may be sorted by a first setup characteristic form type), and the super-groups created by this sorting may subsequently be sorted by a second setup characteristic (insert type).

As illustrated by FIG. 6B, jobs may be arranged within a super-group to minimize setup delays. For example, in FIG. 6B, job J9 is the last job in SG2 615. Because job J9 has an insert type of '2' job J7 becomes the first job in SG3 620 because job J7 also has an insert type of '2'. Arranging jobs in a super-group based on the last job in the previous super-group may increase job processing efficiency by reducing setup delays.

Figure 7A:
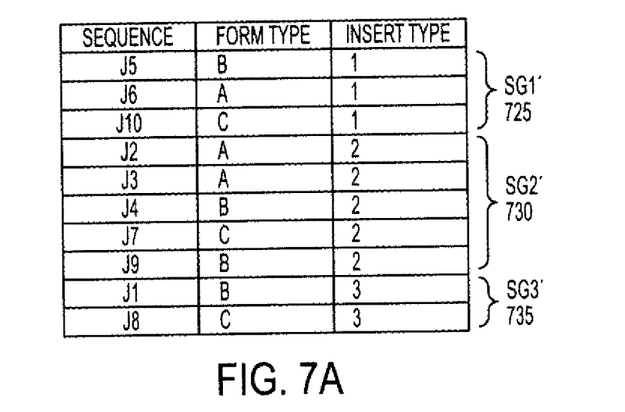
FIG. 7A depicts sorting the plurality of jobs first by insert type and clustering the plurality of jobs into super-groups according to an embodiment.
Figure 7B:
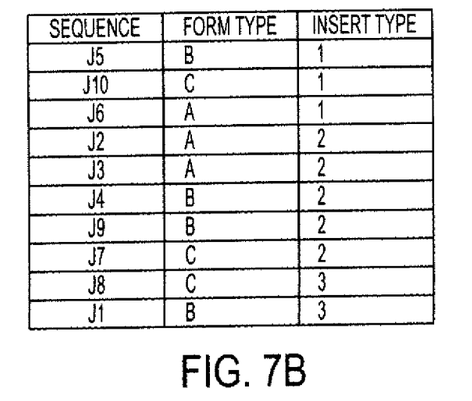
FIG. 7B depicts sorting the super-groups by form type according to an embodiment.

Alternatively, the jobs of FIG. 6A may first be sorted by insert type, as illustrated by FIG. 7A. Sorting by insert type again creates three super-groups: SG1' 725, SG2' 730 and SG3' 735. These super-groups may then be sorted by form type, as illustrated in FIG. 7B. As such, the jobs may be sorted by insert type, and the super-groups created by this sorting may subsequently be sorted by form type. As illustrated by FIG. 7B, the super-groups created by first sorting by insert type differ from the super-groups created by first sorting by form type. Although FIG. 7A and FIG. 7B illustrate sorting jobs based on two setup characteristics, it is understood that the jobs may be sorted in any order based on any number of setup characteristics.

Figure 8:
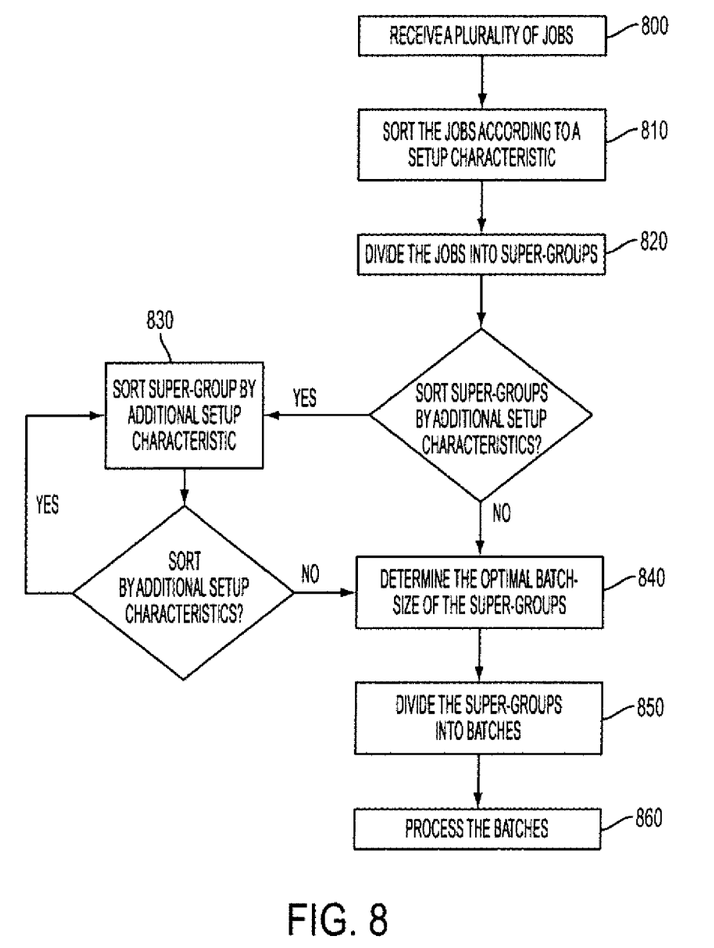
FIG. 8 depicts a flow diagram of an exemplary process for processing jobs according to an embodiment.

FIG. 8 depicts a flow diagram of an exemplary process for processing jobs according to an embodiment. As shown in FIG. 8, jobs may be received 800 and sorted 810 according to a setup characteristic. Once the jobs are sorted 810, they may be divided 820 into super-groups, such that each super-group contains jobs with the same setup characteristic. Each super-group may then be sorted 830 based on additional setup characteristics if necessary. Once all sorting 810, 830 has been completed, the super-groups may be used to determine 840 the optimal batch-size for processing. The super-groups may then be divided 850 into batches and processed 860.

Figure 9:
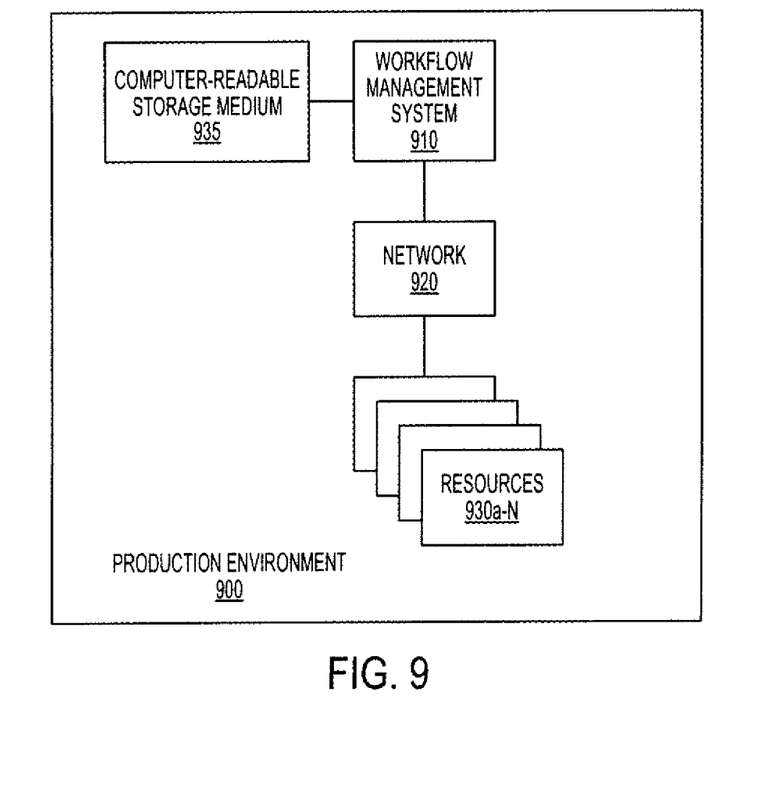
FIG. 9 depicts an environment suitable for processing a plurality of jobs according to an embodiment.

FIG. 9 depicts an environment suitable for practicing the illustrative embodiments. The production environment 900 may include a workflow management system 910 that is responsible for managing workflow in the production environment 900 and a computer-readable storage medium 935. The production environment 900 may also include resources 930a-N such as a printer, a copier, a binder, a hole-punch, a collator, a sealer or any other equipment used to process jobs. The workflow management system 910 may be implemented on a stand-alone computer system or may be integrated into the resources. The workflow management system 910 may also be implemented by distributed components such as separate electronic devices. A network 920 may interconnect the resources 930a-N with the workflow management system 910, as illustrated in FIG. 9. The network 920 may include a local area network (LAN) or a wide area network (WAN) such as the Internet, the World Wide Web or the like. The network 920 may also be formed by communication links that interconnect the workflow management system 910 and the resources 930a-N. Alternatively, the disclosed embodiments may be practiced in environments where there is no network connection.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for processing a plurality of jobs in a production environment, the method comprising:
   receiving a plurality of jobs;
   receiving one or more instructions into a workflow management system to process the plurality of jobs, wherein the one or more instructions include a first setup characteristic and a second setup characteristic for each job of the plurality of jobs;
   clustering, by the workflow management system, the plurality of jobs into a plurality of super-groups based on the first setup characteristic;
   identifying a super-group processing sequence associated with the plurality of super-groups;
   for each super-group, determining, by the workflow management system, a processing sequence of the jobs within the super-group, such that the processing sequences for the plurality of super-groups minimize the processing time associated with processing the plurality of jobs, wherein determining a processing sequence for each super-group comprises:
      determining an optimal batch-size for the super-group, and
      subdividing the super-group into batches each having the optimal batch size;
   arranging, by the workflow management system, the jobs within the super-group according to the determined processing sequence such that a first job within the super-group has a same second setup characteristic value as a last job within an immediately preceding super-group in the super-group processing sequence; and
   processing the jobs according to the determined processing sequence.

2. The method of claim 1, wherein receiving a plurality of jobs comprises:
   receiving a plurality of print jobs in a document production environment.

3. The method of claim 1, wherein clustering the plurality of jobs into super-groups comprises:
   organizing the plurality of jobs such that all jobs in any one of the super-groups share a common first setup characteristic.

4. The method of claim 1, wherein determining an optimal batch-size substantially optimizes a time period for the plurality of jobs to be fully processed.

5. The method of claim 1, wherein processing the jobs comprises: directing jobs having the same first setup characteristic to a common resource.

6. A system for processing a plurality of jobs in a production environment, the system comprising:
   a plurality of document production resources in a print shop;
   a workflow management system that coordinates the flow of jobs to the resources; and
   a non-transitory computer-readable storage medium comprising one or more programming instructions that, when executed, instruct the workflow management system to:
      receive a plurality of jobs,
      receive one or more instructions to process the plurality of jobs, wherein the one or more instructions include a first setup characteristic and a second setup characteristic for each job of the plurality of jobs,
      cluster the plurality of jobs into a plurality of super-groups based on the first setup characteristic for each job,
      identify a super-group processing sequence associated with the plurality of super-groups,
      for each super-group, determine a processing sequence of the jobs within the super-group, such that the processing sequences for the plurality of super-groups minimize the processing time associated with processing the plurality of jobs by,
         determining an optimal batch-size for the super-groups, and
         subdividing the super-groups into batches each having the optimal batch size,
      arrange the jobs within the super-group according to the determined processing sequence such that a first job within the super-group has a same second setup characteristic value as a last job within an immediately preceding super-group in the super-group processing sequence, and
      process the jobs on the resources according to the determined processing sequence.

7. The system of claim 6, wherein the one or more instructions for clustering the plurality of jobs into super-groups comprises one or more programming instructions that, when executed, instruct the workflow management system to organize the plurality of jobs such that all jobs in any one of the super-groups share a common first setup characteristic.

8. The system of claim 6, wherein the one or more instructions for clustering the plurality of jobs into super-groups comprises one or more programming instructions that, when executed, instruct the workflow management system to organize the plurality of jobs such that all jobs in any one of the super-groups share a common first setup characteristic.

9. The system of claim 6, wherein the one or more instructions for determining an optimal batch-size comprises one or more programming instructions that, when executed, instruct the workflow management system to substantially optimize a time period for the plurality of jobs to be fully processed.

10. The system of claim 6, wherein the one or more instructions for processing the jobs comprises one or more programming instructions that, when executed, instruct the workflow management system to direct jobs having the same first setup characteristic to a common production device.

* * * * *